Figure 1:
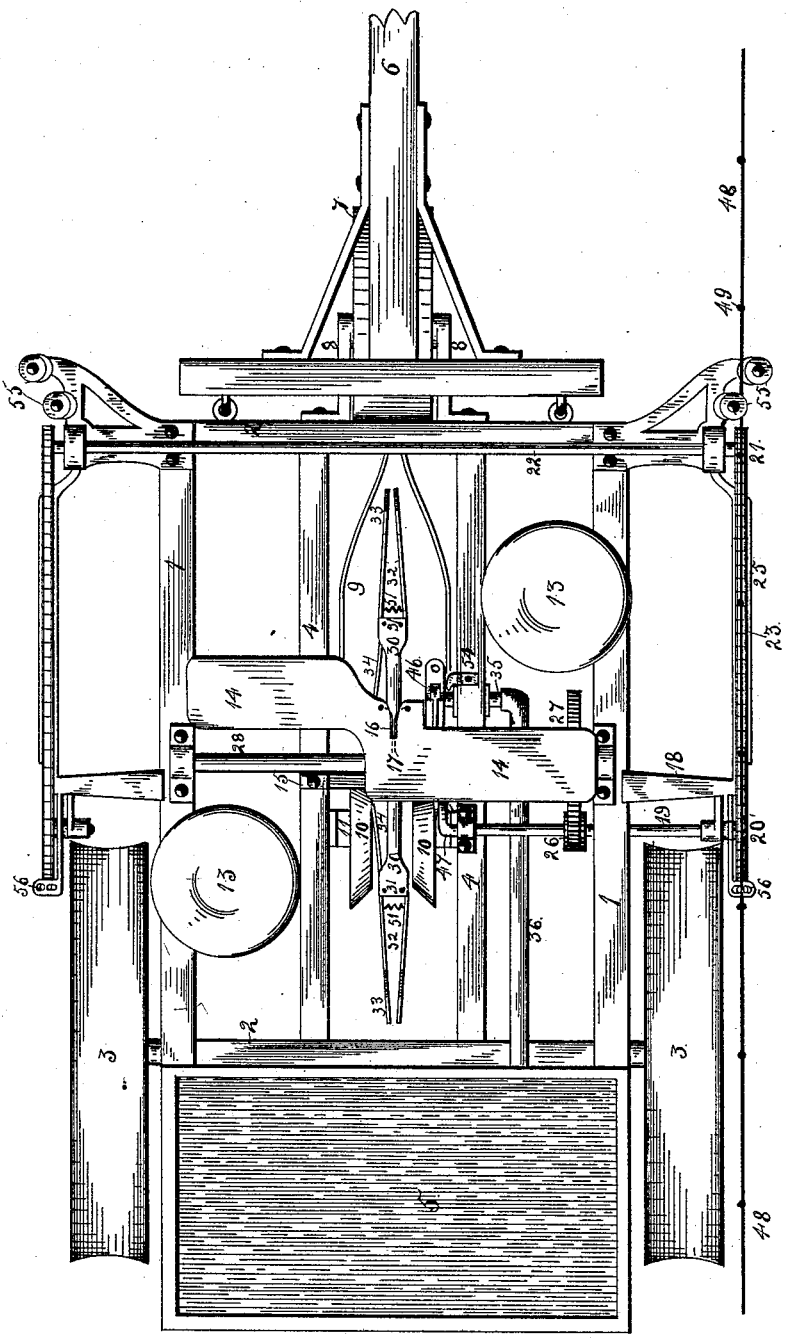

(No Model.)  C. T. FOUNTAIN.  3 Sheets—Sheet 1.
PLANT TRANSPLANTER.

No. 452,181.   Patented May 12, 1891.

Witnesses:
J. A. Smithworth.
B. Behel.

Inventor:
Charles T. Fountain.
By A. O. Behel.
Atty.

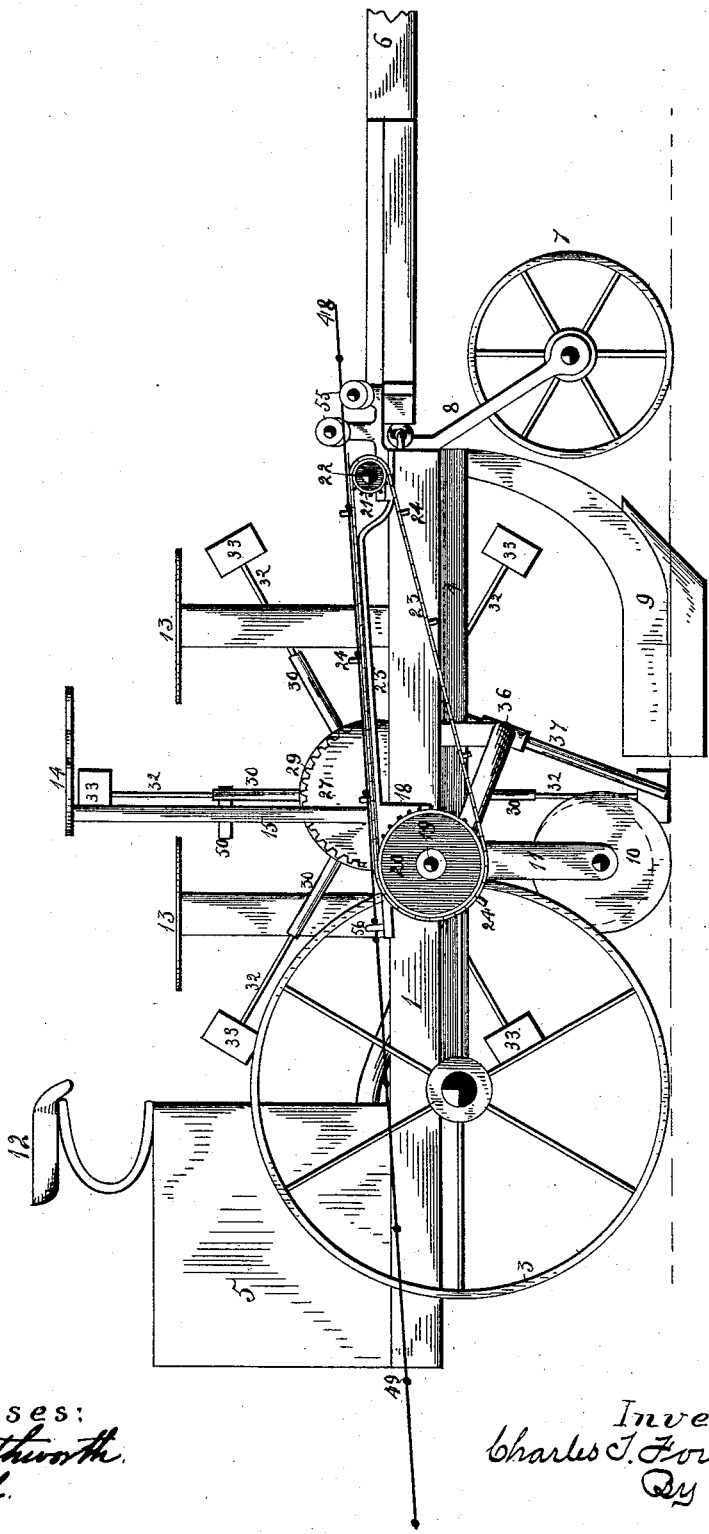

(No Model.) 3 Sheets—Sheet 3.
C. T. FOUNTAIN.
PLANT TRANSPLANTER.
No. 452,181. Patented May 12, 1891.
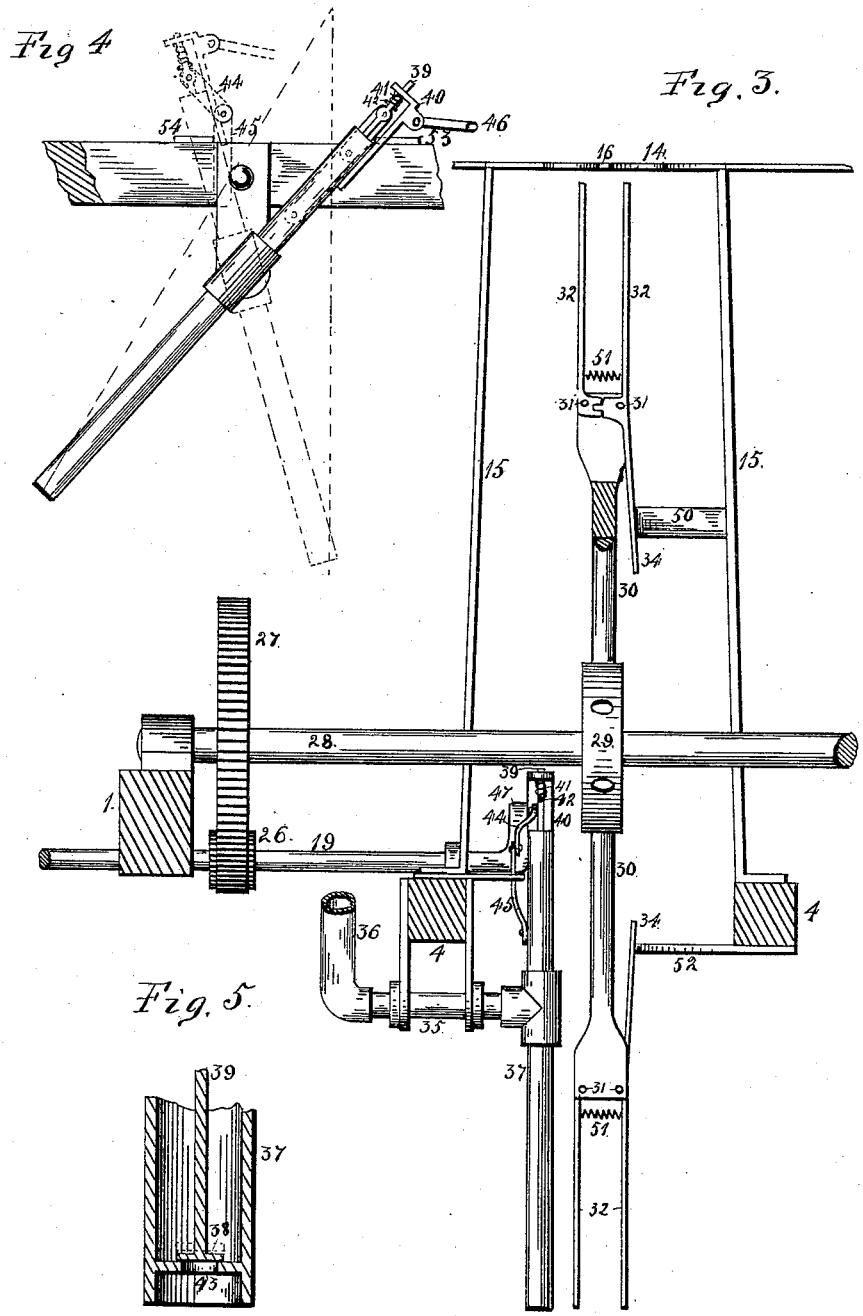

UNITED STATES PATENT OFFICE.

CHARLES T. FOUNTAIN, OF BELOIT, WISCONSIN, ASSIGNOR TO THE GESLEY MANUFACTURING COMPANY.

PLANT-TRANSPLANTER.

SPECIFICATION forming part of Letters Patent No. 452,181, dated May 12, 1891.

Application filed October 14, 1890. Serial No. 368,111. (No model.)

*To all whom it may concern:*

Be it known that I, CHARLES T. FOUNTAIN, a citizen of the United States, residing at Beloit, in the county of Rock and State of Wisconsin, have invented certain new and useful Improvements in Plant-Transplanters, of which the following is a specification.

The object of this invention is to construct a machine for transplanting plants; and it consists of revolving arms provided with devices for holding the plant, which it receives when at its highest point and deposits the plant in the ground when at its lowest point. The device for holding the plant is operated automatically in its clamping and releasing movements, and a water-supply which moves in unison with the arm carrying the plants in the last position of their movements before they release the plant, whereby the plant is watered from the time it enters the ground until released from its engagement with the arms, and, further, consists in the employment of a check-wire chain for imparting movement to the operative parts of the machine.

In the accompanying drawings, Figure 1 is a plan view of a machine embodying my invention. Fig. 2 is a side elevation of the same. Fig. 3 is a front view of the watering device and of the plant-carrying arms, in which two of the arms have been removed from the hub-support to more clearly show the cams for operating the jaws of the arms. Fig. 4 is an inner face elevation of watering device, showing its two extreme positions and the arrangement for opening and closing the valve in the water-discharge pipe. Fig. 5 is an enlarged lengthwise section of the lower end of the water-discharge pipe, showing the valve therein in its open and closed positions.

The main frame of the machine consists of lengthwise bars 1, held separated by transverse bars 2, which are supported upon carrying-wheels 3. Inner lengthwise bars 4 are secured to the under side of the transverse bar 1 and support a portion of the operative parts of the machine.

A water-tank 5 is supported by the main frame of the machine in rear of the carrying-wheels. A tongue 6 has a connection with the forward transverse bar of the main frame, and a small carrying-wheel 7 is secured to the transverse bar by brackets 8 in such a manner as to freely rotate. Said wheel supports the front end of the machine. A furrow-opener 9 has a connection with the forward end of the machine, and has its front edges closed, and its rear and upper surface being open to permit the plant-carrying arm and water-discharge spout to pass between its outer walls. Packing-wheels 10 are supported by depending braces 11, secured to the lengthwise bars 4 of the main frame.

A driver's seat 12 is located on the water-tank, and seats 13 are provided for the attendants who place the plants in the revolving arms. Tables 14 are provided, one for each attendant, and are held by a support 15, secured to the upper surfaces of the lengthwise bars 4. The table has a slot 16 in its front side, and spring-arms 17 are located on the under side of the table, so that a plant placed within the slot will be held by the spring-arms. A bracket 18 is secured to the outside lengthwise bars of the main frame and supports the end of a shaft 19, which extends crosswise of the machine, on the outer end of which is secured a sprocket-wheel 20. This wheel has a chain-belt connection with a sprocket-wheel 21, located near the front end of the machine and secured to a shaft 22, extending across the machine. The chain belt 23 is provided with arms 24 at proper intervals. Underneath the chain is located a support 25, which prevents the sagging of the chain. A small pinion 26 is placed on the shaft 19 and meshes with the teeth of the larger gear-wheel 27, which is located on a shaft 28, extending crosswise of the machine, and upon which, about midway of its length and in the center of the wheel, is located a hub 29, from which radiate arms 30. The extreme ends of these arms are flattened and provided with a groove or recess, in which are located the pivots 31 of the plant-holding arms 32, and these arms having a connection with each other, so that as one arm is operated it will operate the other in the opposite direction. The extreme outer ends of the arms are provided with plates 33, and one of the arms has a portion 34 extending toward the shaft 28 beyond its pivotal connection with the arm 30.

A watering device is located on one of the lengthwise bars 4 and consists of a horizontal portion 35, to which is attached a hose 36, which connects with a water-tank and a vertical portion 37, connecting with the horizontal portion. A valve 38 is located near the lower end of the vertical portion, and a valve-stem 39, connected with the valve, extends upward through the pipe and passes through a stuffing-box in the upper end of the pipe. A guide 40 is secured to the pipe and guides the movement of the valve. A spring 41 is placed between the guide and a pin 42 passed through the valve-stem and exerts its force to hold the valve to its seat 43. Toggle-levers 44 and 45 have a hinge connection with each other, and the one with the pipe 37 and the other with the valve-stem 39. A pitman 46 has a pivotal connection with the upper end of the guide-bar and its other end with the crank 47, formed on the inner end of the shaft 19.

In operating the machine a check-wire chain 48 is stretched across the field, and as the machine is drawn forward the knobs 49 of the chain will engage the studs 24 rising from the sprocket-chain, thereby causing the wheels 20 and 21 to revolve. This movement will cause the arm 30 to revolve forward and will also cause the water-discharge pipe to oscillate on its pivotal connection with the main frame by reason of its crank-connection with the shaft 19. Should a plant be held by the spring-arm 17 and so located that its root will be uppermost, the arms in their rotation will be caused to open just before they reach the plant and remain open until the plant is about midway of the plates 33, when it will close upon the plant and withdraw it from its engagement with the spring-arms. This is accomplished by the end 34 of the jaws engaging a cam 50, secured to the support 15, which will open both jaws by reason of their connection with each other, and when it leaves the cam a spring 51 will bring the arms together. The plant will be carried by the arms as they revolve, and just as the root of the plant enters the opening made by the furrow-opener the water-discharge pipe will hold its position relatively with the plant-carrying arm until the plant is in an upright position, when the arm will release its hold upon it by engaging with a cam 52, located on the under side of the lengthwise bar 4. The water-pipe will readily return to its forward position in time to meet the next descending plant-carrying arm. This operation will be repeated at the setting of each plant. When the lower end of the water-pipe is in its forward position, (shown in solid lines at Fig. 4,) the valve 38 will be open by reason of the toggle-levers engaging a stop 53, secured to the main frame, and will remain open and allow the discharge of water during its rearward movement; but just at the end of the rearward movement the toggle-levers will engage another stop 54, which will break their joint and allow the spring 41 to hold the valve closed during the forward movement, when it again engages the stop 53, which will open the valve. By this construction I water the plant at substantially one point from the time it enters the ground until released by the revolving arms 30. When the supply of water is cut off during the return movement of the discharge-pipe and after the plant is in position, the wheels 10 will pack the earth closely around the root of the plant.

Both sides of the machine are provided with sprocket-wheels and chain belt connecting them, so that the check-wire chain can be employed to operate the machine in its return movement across the field. The check-wire chain 48 is guided in its movements across the sprocket-chain by rollers 55, located near the forward end of the machine, and pins 56 are located rearward of the sprocket-wheel 20.

I employ the check-wire chain to operate the machine when it is desirable to deposit the plants so that they may be cultivated the same as corn, but when I wish to plant them in drills, so that they can be cultivated only one way, the operative parts can be driven direct from the carrying-wheels of the machine, either by gear or drive-chain connection.

I claim as my invention—

1. In a plant-transplanter, the combination of suitable frame-work supporting a planting device, a water-tank carried by the frame, and a movable watering device independent of the plant-carrying device, and means for imparting movement to the planting and watering devices.

2. In a plant-transplanter, the combination of a plant-carrying device and an oscillating watering device.

3. In a plant-transplanter, the combination of a plant-carrying device, an oscillating watering device, a valve for the watering device, and means for automatically permitting a discharge of water, as required.

4. In a plant-transplanter, the combination of a rotary carrying device and an oscillating watering device.

5. In a plant-transplanter, the combination of a rotary plant-carrying device provided with clamps for holding the plants, means for automatically opening the clamps to receive the plant, an oscillating watering device, and means for automatically permitting the discharge of water at desired intervals.

6. In a plant-transplanter, the combination of a plant-carrying device and a watering device independent of each other, both movable in unison in the same direction and at substantially the same speed during the watering of the plant, and means for operating the same.

7. In a plant-transplanter, the combination of a planting device and a watering device, said watering device consisting of an oscillating discharge-pipe, a valve located therein, and stops for operating the valve at the ends of the movement of the pipe.

8. In a plant-transplanter, the combination of a planting device and a watering device, said watering device consisting of an oscillating discharge-pipe, a valve located therein, toggle-levers connected with the pipe and valve-stem, and stops for operating the toggle-levers at each end of the movement of the pipe.

9. In a plant-transplanter, the combination of a revolving plant-carrying device and a supporting plant-holding device, consisting of two jaws having a pivotal connection with their support and a connection with each other, one of said jaws having an extension, and means for operating upon the extension, which when operated upon will open both jaws.

10. In a plant-transplanter, the combination of a plant-carrying device, a movable watering device, independent of each other, and means for operating the same.

CHAS. T. FOUNTAIN.

Witnesses:
WILLIAM STENSON,
PETER T. LEDELL.